United States Patent [19]
Fillet

[11] Patent Number: 4,691,791
[45] Date of Patent: Sep. 8, 1987

[54] KNURLED DRILL STEM

[75] Inventor: Pierre R. Fillet, Paris, France

[73] Assignee: Vallourec, Paris, France

[21] Appl. No.: 641,562

[22] Filed: Aug. 16, 1984

[30] Foreign Application Priority Data

Aug. 17, 1983 [FR] France ................. 83 13379

[51] Int. Cl.$^4$ ............ E21B 17/00; E21B 19/10; F16B 2/12
[52] U.S. Cl. .................... 175/320; 285/144; 403/369
[58] Field of Search ........... 175/320; 285/144–148, 285/421; 403/369, 374, 409; 138/96 T

[56] References Cited
U.S. PATENT DOCUMENTS

| 3,058,386 | 10/1962 | Morrow | 403/369 X |
| 3,152,458 | 10/1964 | Simonin | 175/320 X |
| 3,912,406 | 10/1975 | McGrath | 403/369 X |
| 3,994,517 | 11/1976 | Carmichael et al. | 285/147 X |

FOREIGN PATENT DOCUMENTS

| 537396 | 6/1941 | United Kingdom | 285/146 |
| 757336 | 9/1956 | United Kingdom | 285/148 |
| 780298 | 7/1957 | United Kingdom | 285/146 |

OTHER PUBLICATIONS
The Oil Weekly, Nov. 14, 1938, pp. 10, 11.

Primary Examiner—Stuart S. Levy
Assistant Examiner—Thomas R. Hannon
Attorney, Agent, or Firm—Arnold, White & Durkee

[57] ABSTRACT

The invention disclosed herein concerns a drill stem intended for sinking shafts in the ground, especially for the oil and natural gas industry. It has on its outer periphery a surface of revolution providing a succession of hollow profiles with a rounded shape relative to the axis of the stem, said surfaces for revolution being adapted to rest against the internal faces of complementary shape of self-gripping slips which ensure holding of the drill string.

8 Claims, 4 Drawing Figures

Fig:2

KNURLED DRILL STEM

FIELD OF THE INVENTION

The present invention concerns new drill stems intended for sinking shafts in the ground, especially for the oil and gas industry, containing near the upper part so each stem element a zone intended to serve as a base for slips that support the drill string assembly.

BACKGROUND OF THE INVENTION

It is known that during emplacement of a drill string it is necessary to maintain the upper part of the string with slips that usually include self-gripping jaws whose internal part has serrations or teeth that rest against the drill stem near the threaded female coupling and whose external part has a conical shape which meshes with a piece of corresponding shape to ensure self-gripping of the slips, thus holding the drill string that is suspended over its entire height.

In the technique now employed the teeth on the inner face of the slips that rest against the drill stem produce on the surface of the latter plastic deformations that are conveyed by a succession of notches. This causes a substantial reduction in resistance of the stem at the location where the self-gripping slips are applied, causing fatique rupture of the stem at this site, especially in the case where slanted holes are being drilled.

In other words, the notches, generally angular in shape, made by the slips on the drill stem substantially reduce its fatigue resistance which requires premature replacement of this stem or causes accidents.

SUMMARY OF THE INVENTION

The present invention seeks to overcome this and other drawbacks by making on the part of each element of the drill stem near the threaded female coupling a surface of revolution whose generatrix has a shape complementary to that imparted to the support surface of the self-gripping slips referred to above.

The surface of revolution on the upper part of the drill stem element is advantageously made by knurling or burnishing, which on the one hand permits achievement of the desired profile without a loss of material and, on the other hand, owing to wear hardening of the surface part of the drill stem, imparts to the latter better fatigue resistance.

According to another version the profile according to the invention can be obtained by mechanical wear, preferably followed by treatment, for example, by blasting to increase the fatigue resistance.

In addition, the profiles of the surfaces of revolution so obtained can have a given depth merely by reducing the thickness of the tube by about ½ this depth, this being due to rebound of metal toward the exterior.

The profile of the surface of revolution made on the element of the drill stem preferably has a circular shape at the bottom of the hollow part with the largest possible radius.

According to the invention it is advantageous to use a disymmetric profile, the upper part of the hollow profile preferably having a line that makes an angle between 10° and 45°, preferably about 30°, with a perpendicular to the axis of the stem, whereas the lower part of the profile preferably has a line that makes an angle between 45° and 80°, preferably about 60°, with a perpendicular to the axis of the stem, the angle between the upper part and the lower part of the profile being between 55° and 125°, preferably about 90°.

The total depth of the profile can be between 1 and 2 mm, preferably about 1.5 mm.

The profile described above can be repeated along the part of a drill stem element near the inside threading over a length of about 100 to 900 mm, preferably over a length of about 600 mm at 1 to 10 mm intervals, preferably about 5 mm intervals (i.e., a profile every 5 mm).

The slips that hold the drill string have a complementary profile made with a minimum number of teeth of about 20 in order to mesh easily on the profile of the drill stem element without producing on the stem contact pressures greater than the elastic limit of the stem metal.

BRIEF DESCRIPTION OF THE DRAWINGS

In order to offer a better understanding of the invention an embodiment depicted on the enclosed drawing now will be described by way of nonlimiting illustration. In this drawing.

DETAILED DESCRIPTION OF PREFERRED EMBODIMENTS

Figure 1:
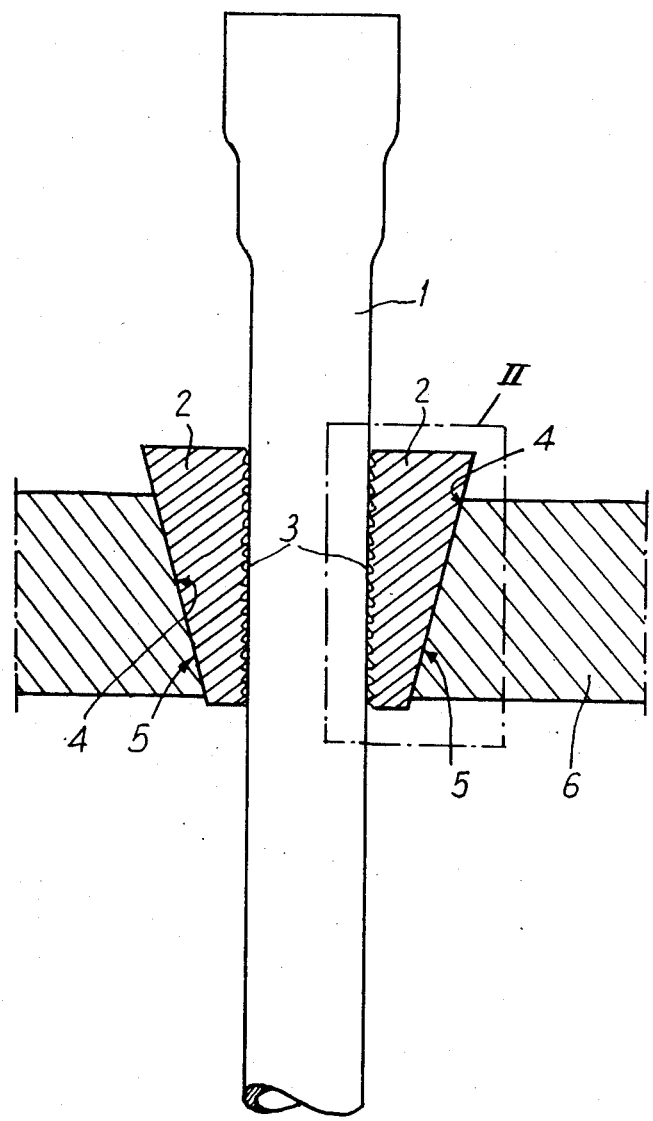
FIG. 1 represents a schematic view of a device according to the state of the art to support a drill string.

We see in FIG. 1 how the upper end of the drill string 1 is supported by means of slips 2 which possess sharp teeth 3 on their internal faces that rest against drill stem 1 and have on their external face a conical surface 4 that cooperates with a conical surface 5 of corresponding shape located on a plate 6.

One can understand under these conditions how slips 2 that are, say three in number, distributed on the periphery of the drill stem, are entrained downward by the weight of the drill stem transmitted by teeth 3 whereas the conical surfaces 4 and 5 force the slips 2 inwardly toward the drill stem for a self-gripping effect.

Considering the substantial weight that the drill string can reach, one can see that considerable radial forces are exerted on the drill stem so that the teeth 3 dig very strongly into the surface of the drill stem, causing notches at the sharp edges that substantially reduce the fatigue resistance of the elements of the drill stem.

Figure 2:
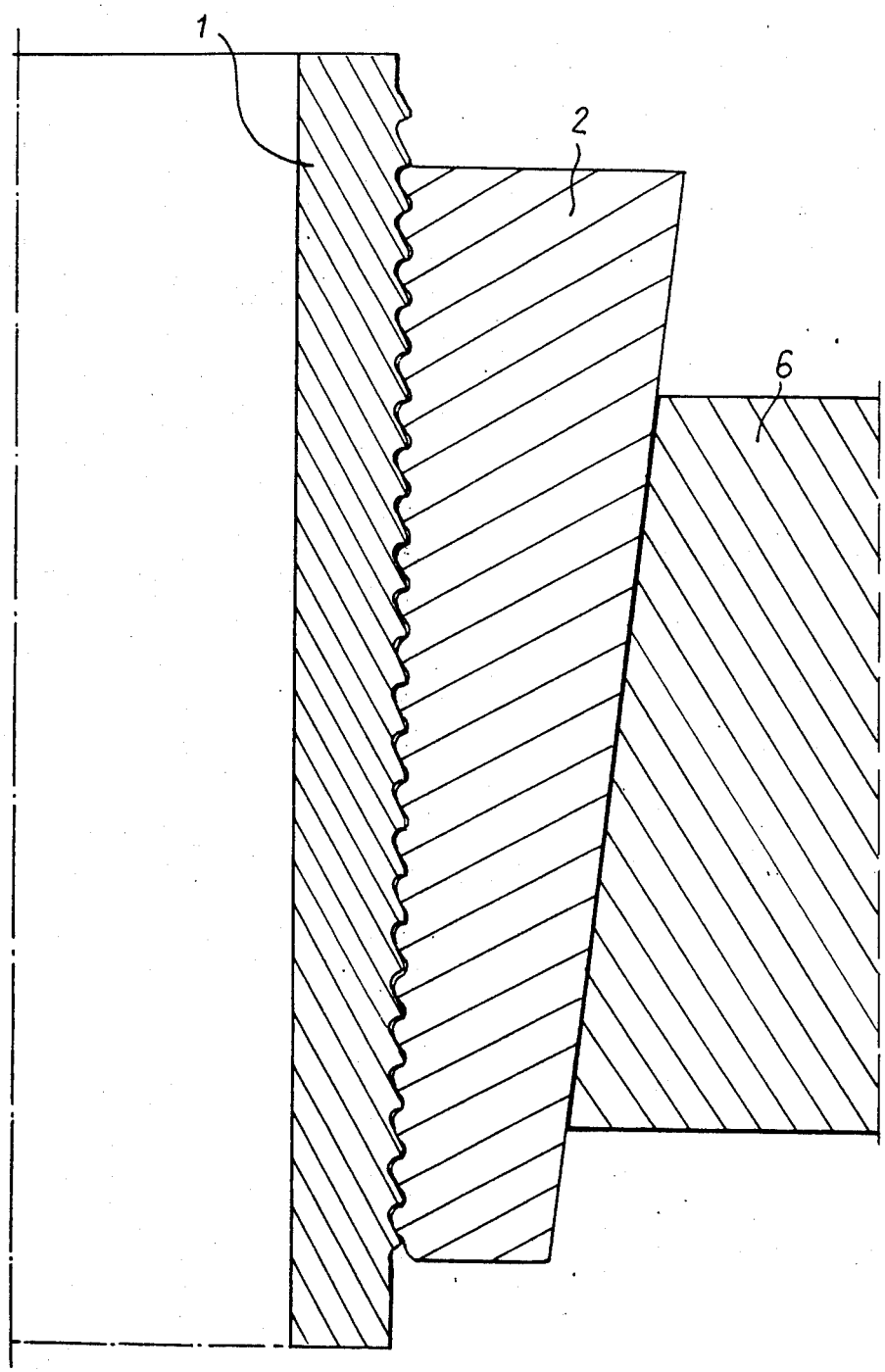
FIG. 2 represents part II of FIG. 1 on a larger scale and modified according to the invention.

FIG. 2 depicts part II of FIG. 1 modified according to the invention.

In FIG. 2 we find plate 6, slips 2 as well as the element of drill stem 1.

According to the invention a special profile is imparted to the external surface of the element of drill stem 1 which is intended to cooperate with slips 2, the internal surface of these slips that rest against the drill stem having a complementary shape.

The profile of the surface of the stem advantageously possesses an axial length greater than that of the slips in order to permit easy engagement.

Figure 3:
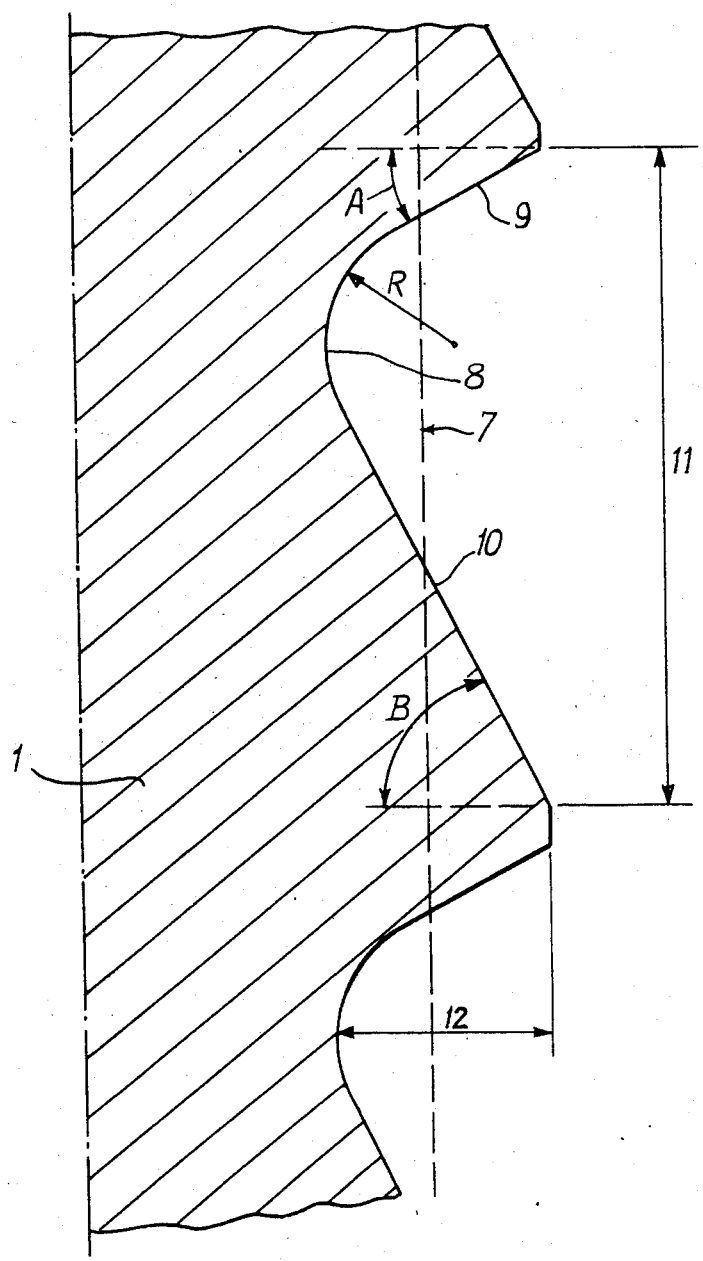
FIG. 3 is a view on a still larger scale representing the profile of the surface of revolution made according to the invention on the upper part of the drill stem element to receive the self-gripping slips.

FIG. 3 shows on a larger scale the external profile of the surface of revolution made according to the invention on the drill stem. Drill stem 1 is again found in this figure where broken line 7 represents the external surface of the element of the drill stem before the profile according to the invention is imparted to it.

As is seen in FIG. 3, the depth of the profile is distributed on both sides of line 7, which enables one to obtain a profile of given depth by reducing the thickness of the stem metal by only about half.

In the embodiment shown, the profile has a toric shape 8 on the inside in which the radius of the generator circle, which is as large as possible, is between 0.2 and 2 mm, for example.

The toric part 8 is extended on its upper part by a tapered zone 9 whose generatrix makes an angle A between about 10° and 45°, preferably about 30°, with a plane perpendicular to the axis of the drill stem.

The toric part 8 is extended on its lower part by a tapered zone 10 whose generatrix makes an angle B between about 45° and 80°, preferably about 60°, with a plane perpendicular to the axis of the drill stem, the angle made between the generatrices of cones 9 and 10 being between about 55° and 125°, preferably about 90°.

The interval, i.e., the distance separating two profiles arranged side by side longitudinally, which is represented at 11 in FIG. 3, is generally between 1 and 10 mm, preferably about 5 mm.

The depth of the profile depicted at 12 in FIG. 3 can be between about 1 and 2 mm and it is preferably close to 1.5 mm, which corresponds to a reduction in useful thickness of the drill stem of only about 0.7 mm.

The profile depicted in FIG. 3 is repeated over a length of about 100 to 900 mm of the drill stem, preferably over a length of about 600 mm in order to impart surfaces of revolution having the described profile over these same lengths.

The self-gripping slips 2 have a surface of revolution of complementary shape on their internal surface and they contain at least 20 teeth whose shape corresponds to that of the grooves described above.

Figure 4:
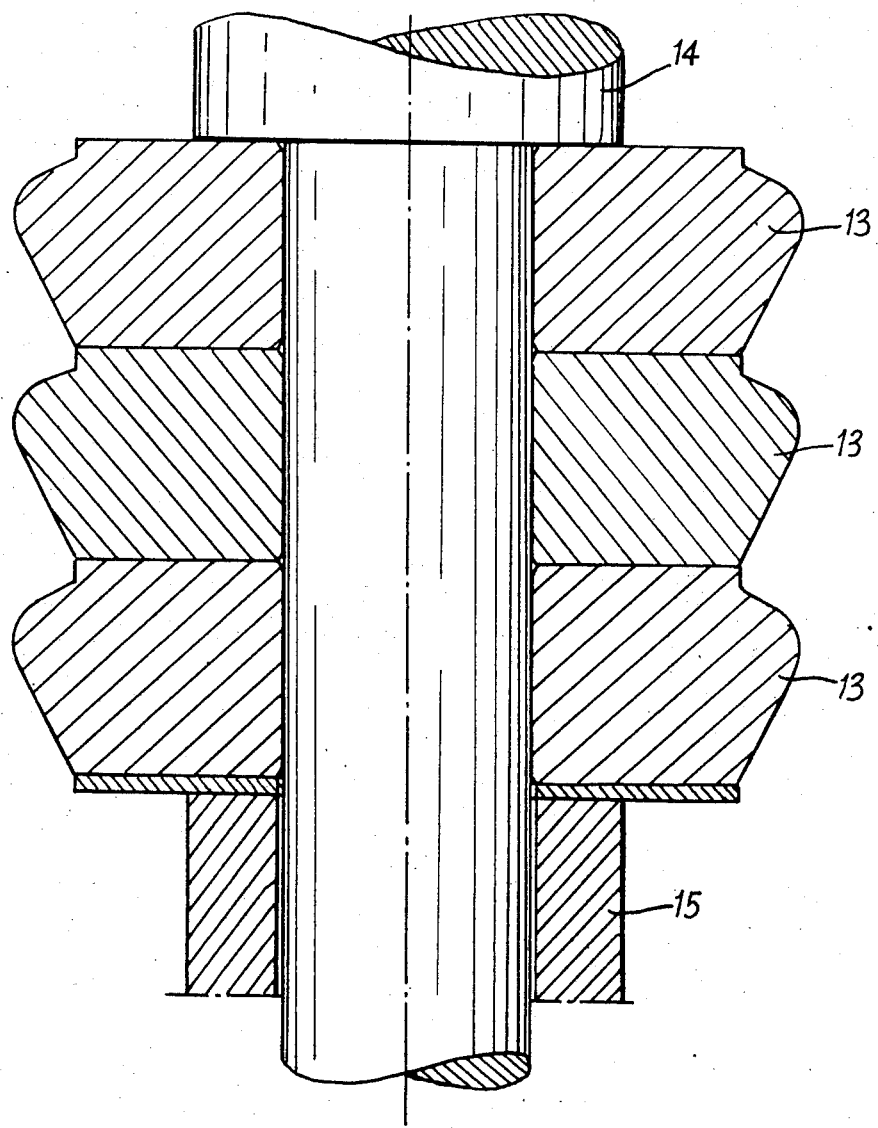
FIG. 4 is a schematic view representing a knurling wheel that makes the surfaces of revolution according to the invention on the elements of the drill stems.

FIG. 4 schematically depicts rollers 13 that permit making of the surfaces of revolution created according to the invention on the drill stems by knurling according to a conventional technique.

In the embodiment of FIG. 4 rollers 13 are assembled on an axis 14, held between a collar and a counter support 15.

The surface of revolution according to the invention is obtained by allowing rollers 13 to act successively at different sites on the drill stem.

One sees that according to the invention it is possible to make surfaces of revolution simply and at lower cost on drill stems, said surfaces having profiles corresponding to the profiles imparted to the internal surface of the self-gripping slips.

In this manner one can easily maintain drill strings without a significant reduction in their mechanical resistance, especially their resistance to alternating stresses, preserving excellent fatigue resistance properties in the gripping zone.

It is understood that the embodiment described above is given merely as an example and in no way limits the invention.

In particular, the surfaces of revolution made on the drill stems according to the invention can have profiles different from that described, provided that these profiles are not made with sharp angles or small radii of curvature that would increase the fragility of the drill stem. Thus, the surfaces of revolution according to the invention can have profiles of circular shape or elliptical shape with a major axis parallel or inclined relative to the axis of the stem.

It also goes without saying that the surfaces of revolution made according to the invention can be obtained by processes other than knurling or burnishing as described above. In the case of machining by elimination of metal it is advantageous to provide surface treatment, for example, blasting.

Finally, the profiles according to the invention can also be made on all the elements or accessories used in drilling.

What is claimed is:

1. A device for holding a drill stem for use in sinking shafts in the ground comprising:
   a drill stem body having on its periphery a surface of revolution with a generatrix comprising a succession of contiguous concave rounded profiles with a substantially toric shape, an upper end of said concave rounded profiles being extended with a substantially flat conical surface and an under end of said concave rounded profiles being extended with a substantially conical surface; and
   a self gripping slip means adapted to hold said drill stem, said slip means having a surface of revolution with a generatrix comprising a succession of contiguous convex rounded profiles having a shape complementary to the shape of said contiguous concave rounded profiles on the periphery of said drill stem body.

2. A device according to claim 1 wherein said surface of revolution of said drill stem is made by a cold deformation of said stem by knurling or burnishing.

3. A device according to claim 1 wherein the substantially toric shape of said contiguous concave rounded profiles of said drill stem have a radius of about 0.2 to 2 mm.

4. A device according to claim 3 wherein said surface of revolution of said drill stem is made by a cold deformation of said stem by knurling or burnishing.

5. A device according to claim 1 wherein the generatrix of said substantially flat conical surface is substantially perpendicular to the generatrix of said conical surface which extends said under end of said rounded profiles on said drill stem.

6. A device according to claim 5 wherein said surface of revolution of said drill stem is made by a cold deformation of said stem by knurling or burnishing.

7. A device according to claim 1 wherein the depth of said concave rounded profiles on said drill stem is about 1 to 2 mm relative to the outer surface of said drill stem.

8. A device according to claim 7 wherein said surface of revolution of said drill stem is made by a cold deformation of said stem by knurling or burnishing.

* * * * *